United States Patent
Hong (10) Patent No.: US 11,374,649 B2
(45) Date of Patent: Jun. 28, 2022

(54) UNMANNED AERIAL VEHICLE (UAV) CAPABILITY INFORMATION TRANSMISSION METHOD, APPARATUS AND SYSTEM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/963,722

(22) PCT Filed: Jan. 31, 2018

(86) PCT No.: PCT/CN2018/074812
§ 371 (c)(1),
(2) Date: Jul. 21, 2020

(87) PCT Pub. No.: WO2019/148389
PCT Pub. Date: Aug. 8, 2019

(65) Prior Publication Data
US 2021/0083761 A1 Mar. 18, 2021

(51) Int. Cl.
*H04B 7/185* (2006.01)
*H04W 8/04* (2009.01)
(Continued)

(52) U.S. Cl.
CPC .......... *H04B 7/18506* (2013.01); *H04W 8/04* (2013.01); *H04W 8/245* (2013.01);
(Continued)

(58) Field of Classification Search
CPC .... H04B 7/18506; H04W 8/04; H04W 8/245; H04W 24/02; H04W 36/0033;
(Continued)

(56) References Cited

U.S. PATENT DOCUMENTS

| | | | | |
|---|---|---|---|---|
| 2016/0255554 | A1* | 9/2016 | Ke | H04W 12/06 455/436 |
| 2018/0014235 | A1 | 1/2018 | Ke et al. | |
| 2019/0212724 | A1* | 7/2019 | Phuyal | H04B 7/18506 |

FOREIGN PATENT DOCUMENTS

| | | | |
|---|---|---|---|
| CN | 101686510 A | | 3/2010 |
| CN | 101938797 A | * | 1/2011 |

(Continued)

OTHER PUBLICATIONS

NTT Docomo, Inc., "UAV UE Certification and License Identification", R2-1713546, 3GPP TSG-RAN2#100, Nov. 27-Dec. 1, 2017. (Year: 2017).*
International Search Report in the International Application No. PCT/CN2018/074812, dated Oct. 16, 2018.
Huawei, HiSilicon, "Enhanced LTE Support for Aerial Vehicles", 3GPP TSG RAN Meeting #78, RP-172457, Lisbon, Portugal, Dec. 18-21, 2017, 4 pages.

(Continued)

*Primary Examiner* — Khoa Huynh
(74) *Attorney, Agent, or Firm* — Finnegan, Henderson, Farabow, Garrett & Dunner, L.L.P.

(57) ABSTRACT

An unmanned aerial vehicle (UAV) capability information transmission method, includes: when a terminal is handed over from a second base station to a first base station, the first base station sending a UAV capability information query request to a network management device; the network management device querying UAV capability information of the terminal according to the UAV capability information query request; and the network management device sending the UAV capability information to the first base station.

15 Claims, 5 Drawing Sheets

(51) Int. Cl.
H04W 8/24 (2009.01)
H04W 36/08 (2009.01)
H04W 40/36 (2009.01)
H04W 72/04 (2009.01)

(52) U.S. Cl.
CPC .......... *H04W 36/08* (2013.01); *H04W 40/36* (2013.01); *H04W 72/048* (2013.01)

(58) Field of Classification Search
CPC . H04W 36/0044; H04W 36/08; H04W 36/32; H04W 40/36; H04W 72/048
See application file for complete search history.

(56) References Cited

FOREIGN PATENT DOCUMENTS

| | | |
|---|---|---|
| CN | 101938797 A | 1/2011 |
| CN | 102340772 A | 2/2012 |
| CN | 105516691 A | 4/2016 |
| CN | 106572508 A | 4/2017 |
| CN | 107357315 A | 11/2017 |
| EP | 2941923 B1 | 2/2017 |
| WO | WO 2017/133461 A1 | 8/2017 |

OTHER PUBLICATIONS

English translation of Written Opinion of International Search Authority in International Application No. PCT/CN2018/074812, dated Oct. 16, 2018.
First Office Action of Chinese Application No. 201880000038.5, dated Nov. 3, 2020.
Office Action dated Aug. 27, 2021, in counterpart India Application No. 202047035923.
Extended Search Report dated Aug. 3, 2021, from the European Patent Office issued in counterpart European Application No. 18904348.2.
NTT Docomo, Inc., "UAV UE Certification and License Identification", 3GPP TSG-RAN2#100, R2-1713546, Nov. 27-Dec. 1, 2017, 3 pages.
Ericsson, "Identify certification for drones", 3GPP TSG-RAN WG2#100, Tdoc R2-1713447, Reno, Nevada, USA, Nov. 1-Dec. 2017, 4 pages.
LG Electronics Inc., "Aerial UE Identification", 3GPP TSG-RAN WG2 Meeting #98, R2-1705659, Hangzhou China, May 15-19, 2017, 2 pages.
Nokia et al., "Discussion on SA2 LS on UAV certification", 3GPP TSG-RAN WG2#100, R2-1713409, Reno, USA, Nov. 27-Dec. 1, 2017, 3 pages.

* cited by examiner

UNMANNED AERIAL VEHICLE (UAV) CAPABILITY INFORMATION TRANSMISSION METHOD, APPARATUS AND SYSTEM

CROSS REFERENCE TO RELATED APPLICATIONS

This application is a national phase application based on International Application No. PCT/CN2018/074812, filed Jan. 31, 2018, the content of which is incorporated herein by reference.

TECHNICAL FIELD

The disclosure relates to the technical field of wireless communication, and particularly to a method, device and system for transmitting unmanned aerial vehicle (UAV) capability information.

BACKGROUND

An unmanned aerial vehicle is referred to as a UAV, and is an aerial vehicle which does not carry a human and is operated by a radio remote control device and a program control device equipped in the aerial vehicle itself.

UAVs may be widely applied to many professions such as agriculture, industries and transportations, and various countries or organizations are actively extending application of UAVs in professions and developing UAV technologies. How to use a cellular communication network to provide a UAV with a service (also referred to as a UAV service) meeting a specific requirement of the UAV has become an important subject of researches in the professions. Enabling a base station in a cellular communication network to learn whether a present terminal has a capability of using a UAV service is the premise of using the cellular communication network to provide the UAV service for the UAV.

SUMMARY

Provided in the disclosure is a method for transmitting UAV capability information. The technical solution is described below.

According to a first aspect of embodiments of the disclosure, provided is a method for transmitting unmanned aerial vehicle (UAV) capability information, including: sending, by a first base station, a UAV capability information query request to a network management device when a terminal is handed over from a second base station to the first base station; querying, by the network management device, UAV capability information of the terminal according to the UAV capability information query request, the UAV capability information indicating whether the terminal has a capability of using a UAV service; and sending, by the network management device, the UAV capability information to the first base station.

According to a second aspect of embodiments of the disclosure, provided is a method for transmitting unmanned aerial vehicle (UAV) capability information, applied to a network management device and including: receiving a UAV capability information query request, the UAV capability information query request being a request sent by a first base station when a terminal is handed over from a second base station to the first base station; querying UAV capability information of the terminal according to the UAV capability information query request, the UAV capability information indicating whether the terminal has a capability of using a UAV service; and sending the UAV capability information to the first base station.

Optionally, querying the UAV capability information of the terminal according to the UAV capability information query request includes: querying, according to the UAV capability information query request, a home subscriber server (HSS) for the UAV capability information of the terminal.

Optionally, receiving the UAV capability information query request includes: receiving, by the network management device, a path switch request; and sending the UAV capability information to the first base station includes: sending a path switch request acknowledge including the UAV capability information to the first base station.

Optionally, the network management device is a mobility management entity (MME).

Optionally, when the UAV capability information indicates that the terminal has the capability of using the UAV service, the UAV capability information further includes: at least one of a UAV terminal type or UAV right information, wherein the UAV terminal type is configured to indicate a UAV type of the terminal and the UAV right information is configured to indicate whether the terminal is authorized to access the UAV service.

According to a third aspect of embodiments of the disclosure, provided is a method for transmitting unmanned aerial vehicle (UAV) capability information, applied to a first base station and including: sending a UAV capability information query request to a network management device, when a terminal is handed over from a second base station to the first base station; and receiving UAV capability information from the network management device, the UAV capability information indicating whether the terminal has a capability of using a UAV service.

Optionally, sending the UAV capability information query request to the network management device includes: sending a path switch request to the network management device; and receiving the UAV capability information from the network management device includes: receiving, from the network management device, a path switch request acknowledge including the UAV capability information.

Optionally, the method further includes: providing the UAV service for the terminal, when the UAV capability information indicates that the terminal has the capability of using the UAV service.

Optionally, when the UAV capability information indicates that the terminal has the capability of using the UAV service, the UAV capability information further includes a UAV terminal type, the UAV terminal type being configured to indicate a UAV type of the terminal; and before providing the UAV service for the terminal, the method further includes: determining, according to the UAV terminal type, the UAV service corresponding to the terminal.

Optionally, when the UAV capability information indicates that the terminal has the capability of using the UAV service, the UAV capability information further includes UAV right information, the UAV right information being configured to indicate whether the terminal is authorized to access the UAV service; and providing the UAV service for the terminal include: executing the step of providing the UAV service for the terminal, when the UAV right information indicates that the terminal has the right to use the UAV service.

Optionally, the UAV service may include at least one of a UAV-specific radio resource management (RRM) service or a UAV-specific power control strategy service.

According to a fourth aspect of embodiments of the disclosure, provided is a device for transmitting unmanned aerial vehicle (UAV) capability information, applied to a network management device and including: a request receiving module, configured to receive a UAV capability information query request, the UAV capability information query request being a request sent by a first base station when a terminal is handed over from a second base station to the first base station; a query module, configured to query UAV capability information of the terminal according to the UAV capability information query request, the UAV capability information indicating whether the terminal has a capability of using a UAV service; and an information sending module, configured to send the UAV capability information to the first base station.

Optionally, the query module is configured to: query, according to the UAV capability information query request, a home subscriber server (HSS) for the UAV capability information of the terminal.

Optionally, the request receiving module is configured to receive a path switch request; and the information sending module is configured to send a path switch request acknowledge including the UAV capability information to the first base station.

Optionally, the network management device is a mobility management entity (MME).

Optionally, when the UAV capability information indicates that the terminal has the capability of using the UAV service, the UAV capability information further includes: at least one of a UAV terminal type or UAV right information, wherein the UAV terminal type is configured to indicate a UAV type of the terminal and the UAV right information is configured to indicate whether the terminal is authorized to access the UAV service.

According to a fifth aspect of embodiments of the disclosure, provided is a device for transmitting unmanned aerial vehicle (UAV) capability information, applied to a first base station and including: a request sending module, configured to send a UAV capability information query request to a network management device, when a terminal is handed over from a second base station to the first base station; and an information receiving module, configured to receive UAV capability information from the network management device, the UAV capability information indicating whether the terminal has a capability of using a UAV service.

Optionally, the request sending module is configured to send a path switch request to the network management device; and the information receiving module is configured to receive, from the network management device, a path switch request acknowledge including the UAV capability information.

Optionally, the device further includes: a service providing module, configured to provide the UAV service for the terminal when the UAV capability information indicates that the terminal has the capability of using the UAV service.

Optionally, when the UAV capability information indicates that the terminal has the capability of using the UAV service, the UAV capability information further includes a UAV terminal type, the UAV terminal type being configured to indicate a UAV type of the terminal; and the device further includes: a determination module, configured to determine, according to the UAV terminal type, the UAV service corresponding to the terminal before the service providing module provides the UAV service for the terminal.

Optionally, when the UAV capability information indicates that the terminal has the capability of using the UAV service, the UAV capability information further includes UAV right information, the UAV right information being configured to indicate whether the terminal is authorized to access the UAV service; and the service providing module is configured to execute the step of providing the UAV service for the terminal when the UAV right information indicates that the terminal has the right to use the UAV service.

Optionally, the UAV service may include at least one of a UAV-specific radio resource management (RRM) service or a UAV-specific power control strategy service.

According to a sixth aspect of embodiments of the disclosure, provided is a system for transmitting unmanned aerial vehicle (UAV) capability information, including a network controller and a first base station connected with the network controller, wherein the network controller includes the device for transmitting UAV capability information according to the fourth aspect or any optional solution of the fourth aspect; and the first base station includes the device for transmitting UAV capability information according to the fifth aspect or any optional solution of the fifth aspect.

According to a seventh aspect of embodiments of the disclosure, provided is a device for transmitting unmanned aerial vehicle (UAV) capability information, applied to a network controller and including: a processor; and a memory configured to store processor-executable instructions, wherein the processor is configured to: receive a UAV capability information query request, the UAV capability information query request being a request sent by a first base station when a terminal is handed over from a second base station to the first base station; query UAV capability information of the terminal according to the UAV capability information query request, the UAV capability information indicating whether the terminal has a capability of using a UAV service; and send the UAV capability information to the first base station.

According to an eighth aspect of embodiments of the disclosure, provided is a device for transmitting unmanned aerial vehicle (UAV) capability information, applied to a first base station and including: a processor; and a memory configured to store processor-executable instructions, wherein the processor is configured to: send a UAV capability information query request to a network management device, when a terminal is handed over from a second base station to the first base station; and receive UAV capability information from the network management device, the UAV capability information indicating whether the terminal has a capability of using a UAV service.

According to a ninth aspect of embodiments of the disclosure, provided is a computer-readable storage medium, including executable instructions which, when invoked by a processor in a network management device, cause the processor to implement the method for transmitting unmanned aerial vehicle (UAV) capability information according to the second aspect or any optional solution of the second aspect.

According to a tenth aspect of the embodiments of the disclosure, provided is a computer-readable storage medium, including executable instructions, which, when invoked by a processor in a first base station, cause the processor to implement the method for transmitting unmanned aerial vehicle (UAV) capability information according to the third aspect or any optional solution of the third aspect.

The technical solutions provided in embodiments of the disclosure may have the following beneficial effects.

In the process where a terminal is handed over from a second base station to a first base station, the first base station acquires UAV capability information of the terminal from a network management device through a UAV capability information query request. In such a manner, in the process where a terminal is handed over from one base station to another base station, the target base station, to which the terminal is handed over, may rapidly acquire UAV capability information of the terminal, so that the response speed of the target base station providing a UAV service for the terminal is increased as much as possible, and the system performance of a wireless communication system in providing the UAV service for the terminal is improved.

It is to be understood that the above general descriptions and detailed descriptions below are only exemplary and explanatory and not intended to limit the disclosure.

BRIEF DESCRIPTION OF THE DRAWINGS

The accompanying drawings here, which are incorporated in and constitute a part of this specification, illustrate embodiments consistent with the disclosure and, together with the description, serve to explain the principles of the disclosure.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of apparatuses and methods consistent with aspects related to the disclosure as recited in the appended claims.

It is to be understood that "a/an" as used herein refers to one or more and "multiple" refers to two or more than two.

The phrase "and/or" describes a relationship of associated objects and indicates that three relationships may exist. For example, A and/or B may represent three situations, i.e., independent existence of A, coexistence of A and B and independent existence of B. The character "/" usually represents an "or" relationship between associated objects before and after the character.

Figure 1:
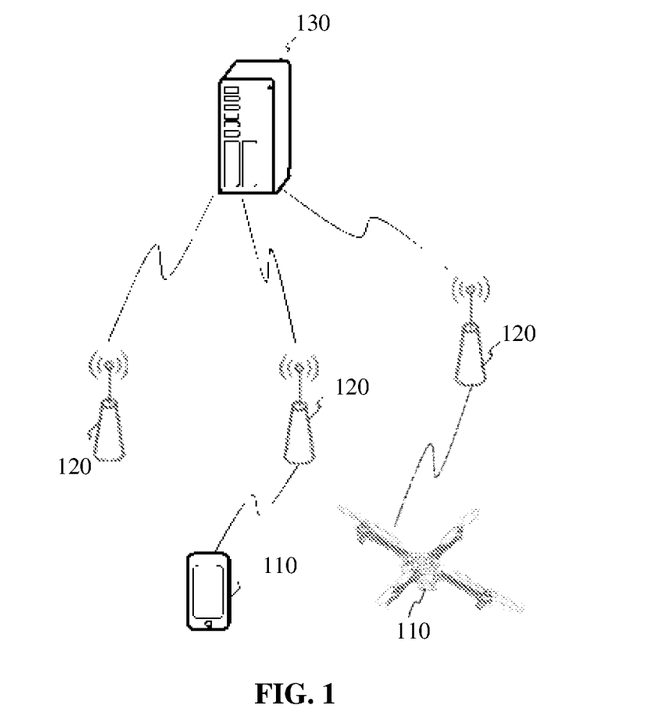
FIG. 1 illustrates a schematic diagram of an implementation environment of a method for transmitting UAV capability information according to some exemplary embodiments.

FIG. 1 illustrates a schematic diagram of an implementation environment of a method for transmitting unmanned aerial vehicle (UAV) capability information according to some exemplary embodiments. As illustrated in FIG. 1, the implementation environment may include a terminal 110, at least two base stations 120 and a network management device 130.

The terminal 110 may be a UAV. For example, the terminal 110 may specifically be an unmanned fixed-wing aircraft, an unmanned vertical take-off and landing aircraft, an unmanned airship, an unmanned helicopter, an unmanned multi-rotor aircraft or an unmanned parawing aircraft.

The terminal 110 may also be a device providing voice and/or data connectivity for a user. The terminal 110 may communicate with one or more core networks through a radio access network (RAN). The terminal 110 may be a mobile terminal, for example, a mobile phone (or referred to as a "cell" phone), or may be a computer with a mobile terminal, for example, a portable, pocket-sized, handheld, computer-embedded or vehicle-mounted mobile device. Examples include: a station (STA), a subscriber unit, a subscriber station, a mobile station, a mobile, a remote station, an access point, a remote terminal, an access terminal, a user terminal, a user agent, a user device or user equipment (UE).

The base station 120 and the network management device 130 may be network-side devices in a wireless communication system. The wireless communication system may be a $4^{th}$-Generation mobile communication (4G) system, also referred to as a long term evolution (LTE) system. The wireless communication system may also be a $5^{th}$-Generation (5G) system, also referred to as a new radio (NR) system. The wireless communication system may also be a next-generation system after the 5G system.

The base station 120 may be an evolved Node B (eNB) in a 4G system. The base station 120 may also be a gNB with a centralized/distributed architecture in a 5G system. A base station 120 with the centralized/distributed architecture usually includes a central unit (CU) and at least two distributed units (DUs). The CU is provided with protocol stacks of a packet data convergence protocol (PDCP) layer, a radio link control (RLC) layer and a media access control (MAC) layer. The DU is provided with a protocol stack of a physical (PHY) layer. Particular implementation of the base station 120 is not limited in the embodiments of the disclosure.

A wireless connection may be established between the base station 120 and the terminal 110 through a radio air interface. In different implementations, the radio air interface is a 4G standard based radio air interface, or the radio air interface is a 5G standard based radio air interface, for example, a new radio (NR) air interface. Alternatively, the radio air interface may also be a radio air interface based on standards of a next-generation mobile communication network technology after 5G.

The at least two base stations 120 may include a first base station and a second base station. When moving from a region where the second base station is located to a region where the first base station is located, the terminal 110 may be handed over from the second base station to the first base station.

The at least two base stations 120 are connected with the network management device 130 respectively. The network management device 130 may be a core network device in the wireless communication system. For example, the network management device 13 may be a mobility management entity (MME) in an evolved packet core (EPC) network. The network management device may also be another core network device, for example, a serving gateway (SGW), a public data network gateway (PGW), a policy and charging rules function (PCRF) or a home subscriber server (HSS). Implementation of the network management device 130 is not limited in the embodiments of the disclosure.

Figure 2:
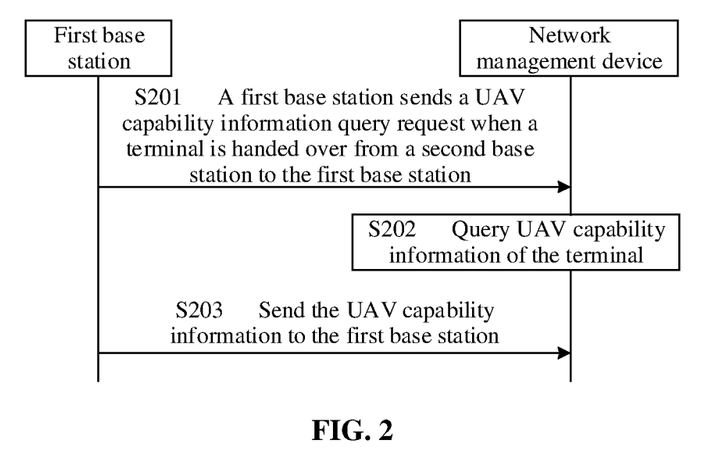
FIG. 2 illustrates a flowchart of a method for transmitting UAV capability information according to an exemplary embodiment.

FIG. 2 illustrates a flowchart of a method for transmitting UAV capability information according to an exemplary embodiment. As illustrated in FIG. 2, the method for transmitting UAV capability information is applied to the implementation environment illustrated in FIG. 1. The method may include the following steps.

In step 201, when a terminal is handed over from a second base station to a first base station, the first base station sends a UAV capability information query request to a network management device, and the network management device receives the UAV capability information query request.

In embodiments of the disclosure, the terminal needs to be handed over from the second base station to the first base station during movement, and the second base station and the first base station may perform information interaction with the network management device to implement path switching (before the switching, data from a core network to the terminal is sent from the core network to the second base station and is then forwarded to the terminal by the second base station; and after the switching, the data from the core network to the terminal is sent from the core network to the first base station and is then forwarded to the terminal by the first base station). In the path switching process, the first base station may query the network management device for UAV capability information of the terminal that is handed over to the first base station.

In step 202, the network management device queries UAV capability information of the terminal according to the UAV capability information query request, the UAV capability information indicating whether the terminal has a capability of using a UAV service.

Optionally, the network management device may locally query for the UAV capability information of the terminal, or the network management device may also query another network device for the UAV capability information of the terminal.

The UAV capability information of the terminal indicates whether the terminal has the capability of using a UAV service. For example, the UAV capability information of the terminal may contain UAV indication information, and the UAV indication information is configured to indicate whether the corresponding terminal is a UAV terminal. When the UAV indication information indicates that the corresponding terminal is a UAV terminal, it is indicated that the terminal has the capability of using a UAV service. On the contrary, when the UAV indication information indicates that the corresponding terminal is not a UAV terminal, it is indicated that the terminal does not have the capability of using a UAV service.

Optionally, when the UAV capability information of the terminal indicates that the terminal has the capability of using the UAV service, the UAV capability information further includes at least one of a UAV terminal type or UAV right information. The UAV terminal type is configured to indicate a UAV type of the terminal, and the UAV right information is configured to indicate whether the terminal is authorized to access the UAV service.

The UAV terminal type may be classified according to a UAV function of the terminal. For example, the UAV terminal type may include: an aerial photography UAV, an agricultural UAV, a plant protection UAV, a miniature selfie UAV, an express transportation UAV, a disaster relief UAV, a wildlife observation UAV, an infectious disease monitoring UAV, a surveying and mapping UAV, a news reporting UAV, a power inspection UAV, an emergency rescue and disaster relief UAV, a film and television shooting UAV, an ordinary UAV and the like.

The UAV right information may contain information for indicating whether the terminal has the right to use a UAV service, and information indicating which UAV service(s) the terminal has the right to use.

For example, there may be multiple types of UAV services, the UAV right information of the terminal may contain a right identifier corresponding to each type of UAV service, and the right identifier is used for indicating whether the terminal is authorized to access the corresponding UAV service. Alternatively, in another possible implementation, the UAV right information of the terminal may contain a service list, and the service list contains identifiers of UAV services that the terminal is authorized to access. If the service list is empty, it is indicated that the terminal has no right to use any UAV service. Alternatively, in another possible implementation, the UAV right information of the terminal may include a service list, and the service list contains identifiers of UAV services that the terminal has no right to use. If the service list is empty, it is indicated that the terminal is authorized to access all of the UAV services.

In step 203, the network management device sends the UAV capability information to the first base station, and the first base station receives the UAV capability information.

Optionally, when the UAV capability information indicates that the terminal has the capability of using the UAV service, the first base station provides the UAV service for the terminal.

After receiving the UAV capability information of the terminal, the first base station may determine, according to the UAV capability information of the terminal, whether to provide the UAV service for the terminal.

For example, when the terminal has the capability of using the UAV service, the first base station may provide the UAV service for the terminal, and when the terminal has no right to use the UAV service, the first base station may not provide the UAV service for the terminal.

From the above, according to the solution of the embodiments of the disclosure, in the process where a terminal is handed over from a second base station to a first base station, the first base station acquires UAV capability information of the terminal from a network management device through a UAV capability information query request. In such a manner, in the process where a terminal is handed over from one base station to another base station, the target base station, to which the terminal is handed over, may rapidly acquire UAV capability information of the terminal, so that the response speed of the target base station providing a UAV service for the terminal is increased as much as possible, and the system performance of a wireless communication system in providing the UAV service for the terminal is improved.

In embodiments of the disclosure, the UAV capability information query request and the UAV capability information may be transmitted between the first base station and the network management device based on an existing signaling in a terminal handover process. For example, in the process where the terminal is handed over from the second base station to the first base station, path switching between the second base station, the first base station and an MME is completed by signaling interaction. When the network management device is an MME, a signaling configured to complete path switching between the first base station and the MME may also be configured to transmit the UAV capability information query request and the UAV capability information.

Figure 3:
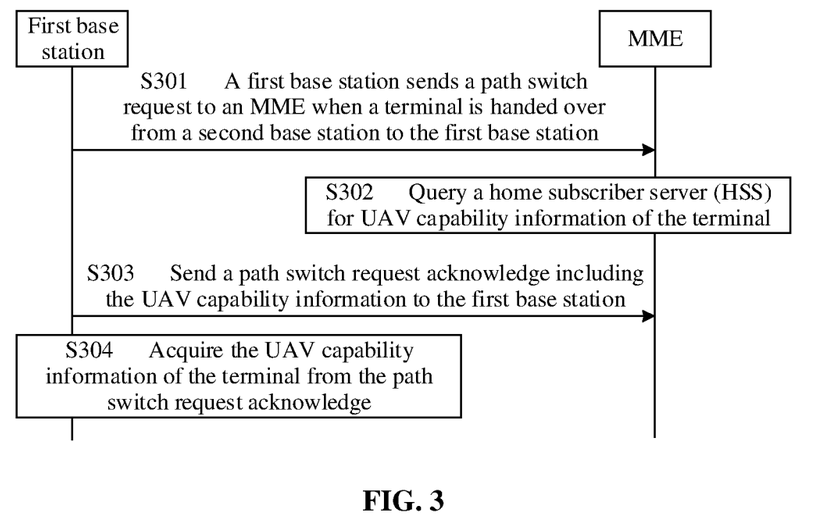
FIG. 3 illustrates a flowchart of a method for transmitting UAV capability information according to an exemplary embodiment.

FIG. 3 illustrates a flowchart of a method for transmitting UAV capability information according to an exemplary embodiment. As illustrated in FIG. 3, in an example, the method for transmitting UAV capability information is applied to the implementation environment illustrated in FIG. 1, and a network management device is an MME and path switching between a second base station and a first base station is implemented based on an X2 interface. The method may include the following steps.

In step 301, when a terminal is handed over from the second base station to the first base station, the first base station sends a path switch request to the MME, and the MME receives the path switch request. The path switch request contains a UAV capability information query request.

Figure 4:
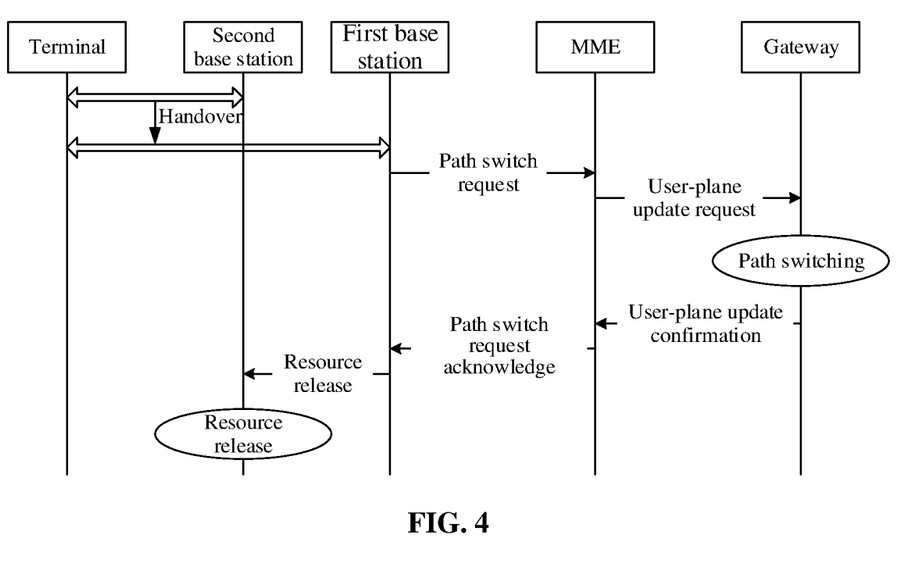
FIG. 4 illustrates a schematic diagram of signaling interaction in a path switching process according to the embodiment illustrated in FIG. 3.

In the related art, during X2 interface based path switching, signaling interaction is performed between the first base station and the MME. FIG. 4 illustrates a schematic diagram of signaling interaction in a path switching process according to embodiments of the disclosure. As illustrated in FIG. 4, in the related art, during X2 interface based path switching, if the terminal is handed over from the second base station to the first base station, the first base station sends a path switch request to the MME. After receiving the path switch request, the MME sends a user-plane update request to a gateway. After receiving the user-plane update request, the gateway completes path switching for the terminal and returns a user-plane update confirmation to the MME. After receiving the user-plane update confirmation, the MME sends a path switch request acknowledge to the first base station. After receiving the path switch request acknowledge, the first base station notifies the second base station to release a resource, and the second base station completes release of the resource corresponding to the terminal.

It can be seen from FIG. 4 that, in the related art, during X2 interface based path switching, the first base station may send a path switch request signaling to the MME. In embodiments of the disclosure, the first base station may multiplex the path switch request signaling in the related art to send the UAV capability information query request to the MME. That is, the first base station does not need to send a newly added signaling to the MME to transmit the UAV capability information query request, so that signaling interaction in a UAV capability information transmission process is reduced, and signaling resources are saved.

In embodiments of the disclosure, when transmitting the UAV capability information query request through the path switch request signaling, the first base station may directly use the path switch request signaling as the UAV capability information query request instead of modifying the path switch request signaling.

Alternatively, in another possible implementation, when transmitting the UAV capability information query request through the path switch request signaling, the first base station may modify the path switch request signaling. For example, the first base station may add a request identification to a certain field in the path switch request signaling, the request identification being the UAV capability information query request mentioned above.

In step 302, the MME queries a home subscriber server (HSS) for UAV capability information of the terminal according to the UAV capability information query request.

The UAV capability information query request may include identification of the terminal, for example, an identifier (ID) of the terminal, a telephone number corresponding to the terminal, a media access control (MAC) address of the terminal or an international mobile subscriber identification number (IMSI) corresponding to the terminal.

The MME may send an information query request containing the terminal identification to the HSS, and the HSS queries for the UAV capability information of the terminal according to the terminal identification and returns the found UAV capability information to the MME.

In embodiments of the disclosure, the UAV capability information of the terminal may be pre-stored in the HSS. For example, when the terminal accesses a wireless communication network for the first time, the terminal may register a core network with the UAV capability information of the terminal. The HSS in the core network stores the UAV capability information of the terminal in correspondence to the terminal identification of the terminal. Alternatively, a network service provider may also pre-register the UAV capability information of the terminal and store, in the HSS, the terminal identification corresponding to the UAV capability information of the terminal.

Description is made in embodiments of the disclosure only with an example that the MME queries the HSS for the UAV capability information of the terminal. During practical application, the UAV capability information of the terminal may also be stored in another network device except the MME and the HSS. For example, the UAV capability information of the terminal may also be stored in a PCRF or a policy and charging enforcement function (PCEF). After receiving the UAV capability information query request, the MME may query the PCRF or the PCEF for the UAV capability information of the terminal.

In another possible implementation, the UAV capability information of the terminal may also be directly stored in the MME. After receiving the UAV capability information query request, the MME may directly query for the UAV capability information of the terminal locally, according to the terminal identification contained in the UAV capability information query request.

In step 303, the MME sends a path switch request acknowledge including the UAV capability information to the first base station, and the first base station receives the path switch request acknowledge.

It can be seen from FIG. 4 that, in the related art, during X2 interface based path switching, the MME will send a path switch request acknowledge signaling to the first base station. In embodiments of the disclosure, the MME may multiplex the path switch request acknowledge signaling in the related art to send the UAV capability information to the first base station. That is, the MME does not need to send a newly added signaling to the first base station to transmit the UAV capability information, so that signaling interaction in the UAV capability information transmission process is reduced, and signaling resources are saved.

In embodiments of the disclosure, when transmitting the UAV capability information through the path switch request acknowledge signaling, the MME may modify the path switch request acknowledge signaling in the related art. For example, the MME may add one or more fields to the path switch request acknowledge signaling and carry the UAV capability information via the one or more fields, or the MME may also add the UAV capability information to an original field (for example, a reserved field) of the path switch request acknowledge signaling.

For example, in the related art, the path switch request acknowledge signaling contains a message type, a unique ID of the terminal at an MME-side S1 interface (i.e., an MME UE S1AP ID), a unique ID of the terminal at a base station-side S1 interface (i.e., eNB UE S1AP ID), a UE aggregate maximum bit rate, and a radio bearer list corresponding to the terminal (for example, an evolved radio access bearer (E-RAB) to be switched in uplink list), etc.

In embodiments of the disclosure, besides the above-mentioned information, the path switch request acknowledge signaling further carries the UAV capability information of the terminal. For example, the UAV capability information may be UAV authorization information (i.e., UAV Authorized). The UAV capability information may be information about an authorization state of the terminal for using a UAV service.

In step 304, the first base station acquires the UAV capability information of the terminal from the path switch request acknowledge.

In embodiments of the disclosure, the first base station may extract the UAV capability information of the terminal from a specified field of the path switch request acknowledge.

From the above, according to the solution in the embodiments of the disclosure, in the process where a terminal is handed over from a second base station to a first base station, the first base station acquires UAV capability information of the terminal from an MME through a UAV capability information query request. In such a manner, in the process where a terminal is handed over from one base station to another base station, the target base station, to which the terminal is handed over, may rapidly acquire UAV capability information of the terminal, so that the response speed of the target base station providing a UAV service for the terminal is increased as much as possible, and the system performance of a wireless communication system in providing the UAV service for the terminal is improved.

In addition, according to the solution in the embodiments of the disclosure, the first base station may transmit the UAV capability information query request to the MME through an existing signaling in the related art, and the MME may also transmit, through an existing signaling in the related art, the UAV capability information of the terminal handed over to the first base station. In this process, there is no need to add a new signaling, so that signaling interaction in the UAV capability information transmission process is reduced, and signaling resources are saved.

In the embodiments of the disclosure, after receiving the UAV capability information of the terminal from the network management device, the first base station may determine, according to the UAV capability information, whether to provide a UAV service for the terminal and which UAV service to provide.

Figure 5:
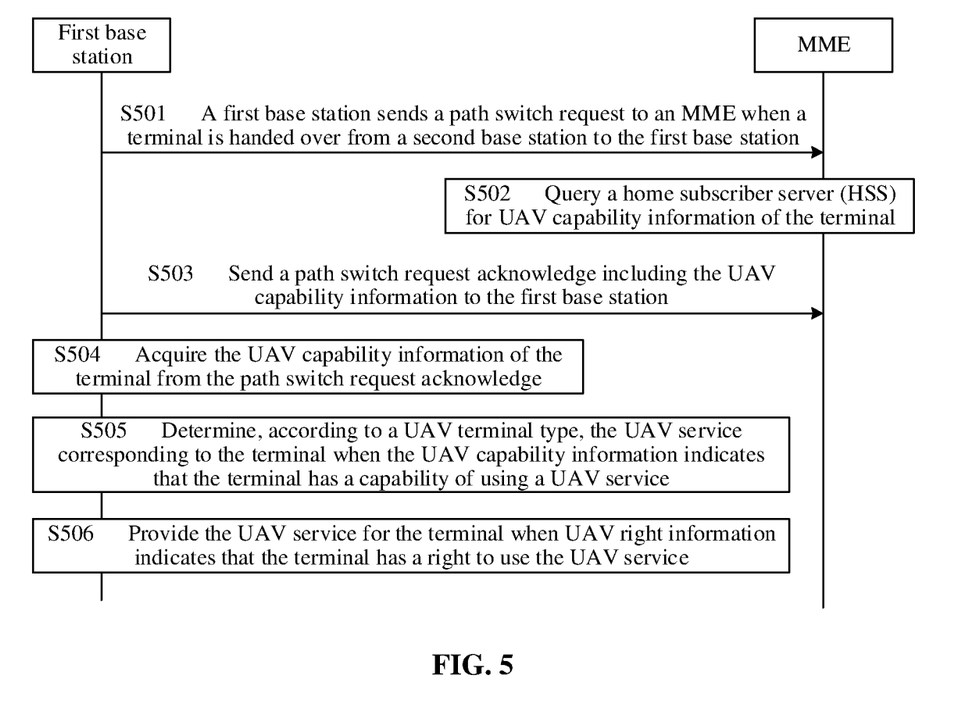
FIG. 5 illustrates a flowchart of a method for transmitting UAV capability information according to an exemplary embodiment.

FIG. 5 illustrates a flowchart of a method for transmitting UAV capability information according to an exemplary embodiment. As illustrated in FIG. 5, in an example, the method for transmitting UAV capability information is applied to the implementation environment illustrated in FIG. 1, a network management device is an MME and path switching between a second base station and a first base station is implemented based on an X2 interface. The method may include the following steps.

In step 501, when a terminal is handed over from the second base station to the first base station, the first base station sends a path switch request to the MME, and the MME receives the path switch request. The path switch request includes a UAV capability information query request.

In step 502, the MME queries an HSS for UAV capability information of the terminal according to the UAV capability information query request.

In step 503, the MME sends a path switch request acknowledge including the UAV capability information to the first base station, and the first base station receives the path switch request acknowledge.

In step 504, the first base station acquires the UAV capability information of the terminal from the path switch request acknowledge.

In step 505, when the UAV capability information indicates that the terminal has a capability of using a UAV service, the first base station determines the UAV service corresponding to the terminal according to a UAV terminal type.

In embodiments of the disclosure, the UAV service may include at least one of a UAV-specific radio resource management (RRM) service or a UAV-specific power control strategy service.

When the UAV capability information indicates that the terminal has the capability of using the UAV service, the UAV capability information may further include a UAV terminal type, the UAV terminal type being configured to indicate a UAV type of the terminal. In embodiments of the disclosure, terminals corresponding to different UAV terminal types may also correspond to respective different UAV services.

For example, a UAV terminal having a relatively important function, such as a disaster relief UAV, an infectious disease monitoring UAV, a power inspection UAV or an emergency rescue and disaster relief UAV, corresponds to a higher priority of radio resource management in a radio resource management service (for example, such a UAV terminal having a relatively important function may be allocated with a radio resource preferentially). A UAV terminal of relatively low importance, such as an aerial UAV, an agricultural UAV, a plant protection UAV, a miniature selfie UAV, an express transportation UAV, a wildlife observation UAV, a surveying and mapping UAV, a news reporting UAV, a film and television shooting UAV and an ordinary UAV, corresponds to a lower priority of radio resource management in the radio resource management service (for example, such a UAV terminal of relatively low importance would not be allocated with a radio resource preferentially).

Alternatively, a UAV terminal having a relatively important function, such as a disaster relief UAV, an infectious disease monitoring UAV, a power inspection UAV or an emergency rescue and disaster relief UAV, corresponds to a higher transmission power in a power control strategy service (for example, the first base station may send a signal to such a UAV terminal with a relatively important function in a higher transmission power). A UAV terminal of relatively low importance, such as an aerial UAV, an agricultural UAV, a plant protection UAV, a miniature selfie UAV, an express transportation UAV, a wildlife observation UAV, a surveying and mapping UAV, a news reporting UAV, a film and television shooting UAV and an ordinary UAV, corresponds to a lower transmission power in the power control strategy service (for example, the first base station may send a signal to such a UAV terminal with an unimportant function only in lower transmission power, to avoid excessive interference to another terminal).

In step 506, when UAV right information indicates that the terminal is authorized to access the UAV service, the first base station provides the UAV service for the terminal.

When the UAV capability information indicates that the terminal has the capability of using the UAV service, the UAV capability information further includes the UAV right information, the UAV right information being used for indicating whether the terminal has the right to use the UAV service. Only if the UAV right information indicates that the terminal has the right to use the UAV service, the first base station executes the step of providing the UAV service for the terminal. That is, even if the terminal has the capability of using the UAV service, the first base station would not provide the UAV service for the terminal if the terminal does not have the right to use the UAV service.

Based on the UAV service, the first base station may allocate a dedicated radio resource for the UAV terminal, to avoid interference to an ordinary terminal (for example, interrupting mobile communication of a mobile phone and the like) or interference from the ordinary terminal. Alternatively, based on the UAV service, the first base station may send a signal to the UAV terminal in a low transmission power, to avoid excessive interference to the ordinary terminal.

From the above, according to the solution in the embodiments of the disclosure, in the process where a terminal is handed over from a second base station to a first base station, the first base station acquires UAV capability information of the terminal from an MME through a UAV capability information query request. In such a manner, in the process where the terminal is handed over from one base station to another base station, the target base station, to which the terminal is handed over, may rapidly acquire UAV capability information of the terminal, so that the response speed of the target base station providing a UAV service for the terminal is increased as much as possible, and the system performance of a wireless communication system in providing the UAV service for the terminal is improved.

In addition, according to the solution in the embodiments of the disclosure, the first base station may transmit the UAV capability information query request to the MME through an existing signaling in the related art, and the MME may also transmit, to the first base station through an existing signaling in the related art, the UAV capability information of the terminal handed over to the first base station. In this process, no new signaling needs to be added, so that signaling interaction in the UAV capability information transmission process is reduced, and signaling resources are saved.

Moreover, according to the solution in the embodiments of the disclosure, when UAV capability information indicates that a terminal has a capability of using a UAV service, a first base station determines the UAV service corresponding to the terminal according to a UAV terminal type in the UAV capability information, and provides the UAV service for the terminal when the UAV right information in the UAV capability information indicates that the terminal has the right to use the UAV service. The flexibility in providing a UAV service for the terminal is improved.

Through the above embodiments illustrated in FIG. 3 and FIG. 5, in a handover process of a terminal, an MME may notify a related UAV capability (i.e., the UAV capability information) to a target base station (i.e., the first base station above) to which the terminal is handed over, such that the target base station may decide, according to the UAV capability of the terminal that has just been handed over to the target base station, whether to provide a related UAV service for the terminal.

That is, a method for transmitting UAV capability information in a UAV handover process is proposed in the above solutions illustrated in FIG. 3 and FIG. 5.

For X2 interface based handover, after the UAV terminal establishes a radio resource control (RRC) connection with the target base station, the target base station sends a path switch request signaling to the MME, to request for switching a path towards the source base station to be a path towards the target base station. After receiving the path switch request signaling from the target base station, the MME queries for the UAV capability information of the terminal, verifies whether the UE is authorized to access the UAV service, and notifies a query result to the target base station through the path switch request acknowledge signaling. If the MME indicates that the terminal is authorized to access the UAV service, the target base station may provide the UAV service for the terminal. If the MME indicates that the terminal is not authorized to accessed the UAV service, the target base station may not provide the UAV service for the terminal.

In addition, description is made in the embodiments illustrated in FIG. 3 and FIG. 5 with an example that a network device is an MME, a first base station multiplexes an existing path switch request signaling in the related art to send a UAV capability information query request to the MME, and the MME multiplexes an existing path switch request acknowledge signaling in the related art to send UAV capability information to the first base station.

However, during practical application, the first base station may multiplex the path switch request signaling to send the UAV capability information query request to the MME, but the MME sends the UAV capability information to the first base station through another signaling instead of multiplexing the path switch request acknowledge signaling. Alternatively, the first base station may send the UAV capability information query request to the MME through another signaling instead of multiplexing the path switch request signaling, and the MME multiplexes the path switch request acknowledge signaling to send the UAV capability information to the first base station.

Moreover, description is made in the embodiments illustrated in FIG. 3 and FIG. 5 with an example that a first base station and a network management device multiplex an existing signaling in the related art to transmit UAV capability information query request and UAV capability information.

However, during practical application, the UAV capability information query request and the UAV capability information may also be transmitted between the first base station and the network management device through a newly added signaling.

Furthermore, description is made in the embodiments illustrated in FIG. 3 and FIG. 5 with an example that a network management device is an MME.

However, during practical application, the network management device is not limited to an MME, and may also be another network device such as an SGW, a PGW, a PCRF or an HSS.

Described below is a device embodiment of the disclosure. The device may be configured to execute the method embodiment of the disclosure. For details that are not disclosed in the device embodiment of the disclosure, please refer to the method embodiment of the disclosure.

Figure 6:
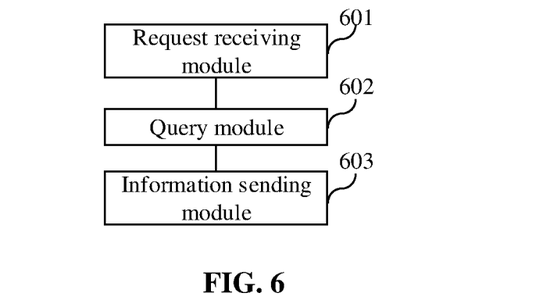
FIG. 6 illustrates a block diagram of a device for transmitting UAV capability information according to an exemplary embodiment.

FIG. 6 illustrates a block diagram of a device for transmitting UAV capability information according to an exemplary embodiment. As illustrated in FIG. 6, the device for transmitting UAV capability information may be implemented as all or part of a network management device in the implementation environment illustrated in FIG. 1 through hardware or a combination of software and hardware, to execute the steps executed by the network management device in any of the embodiments illustrated in FIG. 2, FIG. 3 or FIG. 5. The device for transmitting UAV capability information may include: a request receiving module 601, a query module 602, and an information sending module 603.

The request receiving module 601 is configured to receive a UAV capability information query request. The UAV capability information query request is a request sent by a first base station when a terminal is handed over from a second base station to the first base station.

The query module 602 is configured to query UAV capability information of the terminal according to the UAV capability information query request. The UAV capability information indicates whether the terminal has a capability of using a UAV service.

The information sending module 603 is configured to send the UAV capability information to the first base station.

Optionally, the query module 602 is specifically configured to: query a home subscriber server (HSS) for the UAV capability information of the terminal according to the UAV capability information query request.

Optionally, the request receiving module 601 is specifically configured to receive a path switch request. The information sending module 603 is specifically configured to send a path switch request acknowledge including the UAV capability information to the first base station.

Optionally, the network management device is a mobility management entity (MME).

Optionally, when the UAV capability information indicates that the terminal has the capability of using the UAV service, the UAV capability information further includes: at least one of a UAV terminal type or UAV right information. The UAV terminal type is configured to indicate a UAV type of the terminal and the UAV right information is configured to indicate whether the terminal is authorized to access the UAV service.

From the above, according to the solution in the embodiments of the disclosure, in the process where a terminal is handed over from a second base station to a first base station, the first base station acquires UAV capability information of the terminal from a network management device through a UAV capability information query request. In such a manner, in the process where a terminal is handed over from one base station to another base station, the target base station, to which the terminal is handed over, may rapidly acquire UAV capability information of the terminal, so that the response speed of the target base station for providing a UAV service for the terminal is increased as much as possible, and the system performance of a wireless communication system in providing the UAV service for the terminal is improved.

Figure 7:
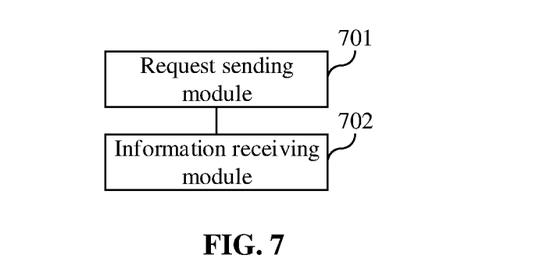
FIG. 7 illustrates a block diagram of a device for transmitting UAV capability information according to an exemplary embodiment.

FIG. 7 illustrates a block diagram of a device for transmitting UAV capability information according to an exemplary embodiment. As illustrated in FIG. 7, the device for transmitting UAV capability information may be implemented as all or part of a first base station in the implementation environment illustrated in FIG. 1 through hardware or a combination of software and hardware, to execute the steps executed by the first base station in the embodiment illustrated in any one of FIG. 2, FIG. 3 or FIG. 5. The device for transmitting UAV capability information may include: a request sending module 701 and an information receiving module 702.

The request sending module 701 is configured to send a UAV capability information query request to a network management device, when a terminal is handed over from a second base station to a first base station.

The information receiving module 702 is configured to receive UAV capability information from the network management device, the UAV capability information indicating whether the terminal has a capability of using a UAV service.

Optionally, the request sending module 701 is specifically configured to send a path switch request to the network management device. The information receiving module 702 is specifically configured to receive, from the network management device, a path switch request acknowledge including the UAV capability information.

Figure 8:
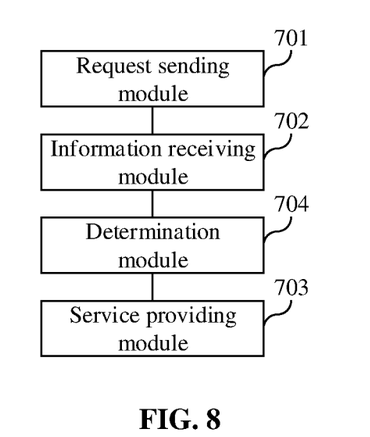
FIG. 8 illustrates a block diagram of a device for transmitting UAV capability information according to another exemplary embodiment.

FIG. 8 illustrates block diagram of a device for transmitting UAV capability information according to another exemplary embodiment. Based on FIG. 7, as illustrated in FIG. 8, the device for transmitting UAV capability information further includes: a service providing module 703.

The service providing module 703 is configured to provide the UAV service for the terminal when the UAV capability information indicates that the terminal has the capability of using the UAV service.

Optionally, when the UAV capability information indicates that the terminal has the capability of using the UAV service, the UAV capability information further includes a UAV terminal type, the UAV terminal type being configured to indicate a UAV type of the terminal. The device further includes: a determination module 704, configured to determine, according to the UAV terminal type, the UAV service corresponding to the terminal before the service providing module provides the UAV service for the terminal.

Optionally, when the UAV capability information indicates that the terminal has the capability of using the UAV service, the UAV capability information further includes UAV right information, the UAV right information being configured to indicate whether the terminal is authorized to access the UAV service. The service providing module 703 is specifically configured to execute the step of providing the UAV service for the terminal when the UAV right information indicates that the terminal has the right to use the UAV service.

Optionally, the UAV service includes at least one of a UAV-specific radio resource management service or a UAV-specific power control strategy service.

From the above, according to the solution in the embodiments of the disclosure, in the process where a terminal is handed over from a second base station to a first base station, the first base station acquires UAV capability information of the terminal from a network management device through a UAV capability information query request. In such a manner, in the process where a terminal is handed over from one base station to another base station, the target base station, to which the terminal is handed over, may rapidly acquire UAV capability information of the terminal, so that the response speed of the target base station for providing a UAV service for the terminal is increased as much as possible, and the system performance of a wireless communication system in providing the UAV service for the terminal is improved.

Moreover, according to the solution in the embodiments of the disclosure, when the UAV capability information indicates that the terminal has the capability of using the UAV service, the first base station determines the UAV service corresponding to the terminal according to the UAV terminal type contained in the UAV capability information, and provides the UAV for the terminal when the UAV right information in the UAV capability information indicates that the terminal has the right to use the UAV service. The flexibility in providing a UAV service for the terminal is improved.

In an exemplary embodiment of the disclosure, also provided is a system for transmitting UAV capability information, which includes a network management device and a first base station.

The network management device includes the device for transmitting UAV capability information provided in the embodiment illustrated in FIG. 6 or any optional embodiment provided based on the embodiment illustrated in FIG. 6.

The first base station includes the device for transmitting UAV capability information provided in the embodiment illustrated in FIG. 7 or any optional embodiment provided based on the embodiment illustrated in FIG. 7.

It is to be noted that division of the functional modules above is merely an example taken for describing functions of the device provided in the embodiments above. In practical application, the above-mentioned functions may be allocated to different functional modules for realization according to practical requirements, that is, a content structure of the device is divided into different functional modules to realize all or some of the functions described above.

With respect to the device in the above embodiments, the particular manners of performing operations by the modules therein have been described in detail in the related method embodiment, which will not be elaborated herein.

In an exemplary embodiment of the disclosure, provided is a device for transmitting UAV capability information, which may implement all or some of the steps executed by the network management device in the embodiments of the disclosure shown in FIG. 2, FIG. 3 or FIG. 5. The device for transmitting UAV capability information includes a processor and a memory configured to store processor-executable instructions.

The processor is configured to: receive a UAV capability information query request, the UAV capability information query request being a request sent by a first base station when a terminal is handed over from a second base station to the first base station; query UAV capability information of the terminal according to the UAV capability information query request, the UAV capability information indicating whether the terminal has a capability of using a UAV service; and send the UAV capability information to the first base station.

Optionally, the operation that the UAV capability information of the terminal is queried according to the UAV capability information query request includes that a home subscriber server (HSS) is queried, according to the UAV capability information query request, for the UAV capability information of the terminal.

Optionally, the operation that the UAV capability information query request is received includes that: the network management device receives a path switch request. The operation that the UAV capability information is sent to the first base station includes that a path switch request acknowledge including the UAV capability information is sent to the first base station.

Optionally, the network management device is an MME.

Optionally, when the UAV capability information indicates that the terminal has the capability of using the UAV service, the UAV capability information further includes: at least one of a UAV terminal type or UAV right information. The UAV terminal type is configured to indicate a UAV type of the terminal, and the UAV right information is configured to indicate whether the terminal is authorized to access the UAV service.

In an exemplary embodiment of the disclosure, provided is a device for transmitting UAV capability information, which may implement all or some of the steps executed by a first base station in the embodiments of the disclosure illustrated in FIG. 2, FIG. 3 or FIG. 5. The device for transmitting UAV capability information includes a processor and a memory configured to store processor-executable instructions.

The processor is configured to: send a UAV capability information query request to a network management device when a terminal is handed over from a second base station to the first base station; and receive UAV capability information from the network management device, the UAV capability information indicating whether the terminal has a capability of using a UAV service.

Optionally, the operation that the UAV capability information query request is sent to the network management device includes that a path switch request is sent to the network management device. The operation that the UAV capability information is received from the network management device includes that a path switch request acknowledge including the UAV capability information is received from the network management device.

Optionally, the processor is further configured to: provide the UAV service for the terminal, when the UAV capability information indicates that the terminal has the capability of using the UAV service.

Optionally, when the UAV capability information indicates that the terminal has the capability of using the UAV service, the UAV capability information further includes a UAV terminal type, the UAV terminal type being configured to indicate a UAV type of the terminal. The processor is further configured to: determine, according to the UAV terminal type, the UAV service corresponding to the terminal, before providing the UAV service for the terminal.

Optionally, when the UAV capability information indicates that the terminal has the capability of using the UAV service, the UAV capability information further includes UAV right information, the UAV right information being configured to indicate whether the terminal is authorized to access the UAV service. The operation of providing the UAV service for the terminal includes: executing the step of providing the UAV service for the terminal when the UAV right information indicates that the terminal has the right to use the UAV service.

Optionally, the UAV service includes at least one of a UAV-specific radio resource management service or a UAV-specific power control strategy service.

The solutions provided in the embodiments of the disclosure are described mainly with the network management device and the first base station as examples. It is to be understood that, for realizing the above functions, the network management device and the first base station include hardware structures and/or software modules for executing corresponding functions. In combination with the modules and algorithm steps described in the embodiments disclosed in the disclosure, the embodiments of the disclosure may be implemented by hardware or a combination of hardware and computer software. Whether a function is executed by the hardware or in a manner of computer software driving hardware depends on specific applications and design constraints of the technical solutions. Those skilled in the art may realize the described functions for each specific application by different means, but such realization shall not be construed departing away from the scope of the technical solutions of the embodiments of the disclosure.

Figure 9:
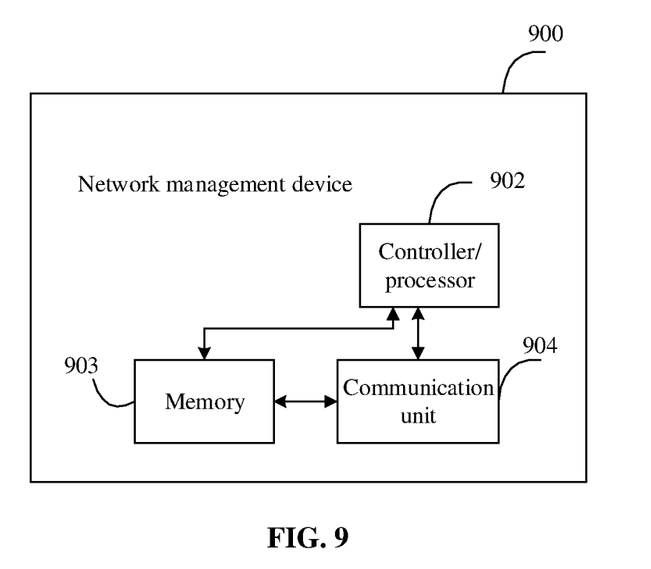
FIG. 9 illustrates a schematic structural diagram of a network management device according to an exemplary embodiment.

FIG. 9 illustrates a schematic structural diagram of a network management device according to an exemplary embodiment.

The network management device 900 includes a communication unit 904 and a processor 902. The processor 902 may also be a controller, and is represented as "controller/processor 902" in FIG. 9. The communication unit 904 is configured to support the network management device in communicating with another network entity (for example, another network device in a core network).

Furthermore, the network management device 900 may further include a memory 903. The memory 903 is configured to store program codes and data of the network management device 900.

It is to be understood that FIG. 9 only illustrates a simplified design of the network management device 900. During practical application, the network management device 900 may include any number of processors, controllers, memories, communication units and the like, and all network management devices capable of implementing the embodiments of the disclosure fall within the scope of protection of the embodiments of the disclosure.

Figure 10:
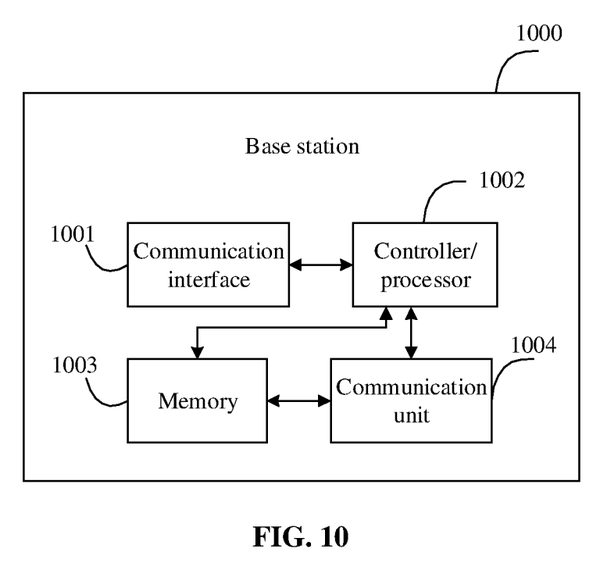
FIG. 10 illustrates a schematic structural diagram of a base station according to an exemplary embodiment.

FIG. 10 illustrates a schematic structural diagram of a base station according to an exemplary embodiment.

The base station 1000 includes a communication interface 1001 and a processor 1002. The processor 1002 may also be a controller, and is represented as "controller/processor 1002" in FIG. 10. The communication interface 1001 is configured to support the base station in information transceiving with the terminal in the above embodiment. The processor 1002 executes various functions for communication with the terminal. In an uplink, protocol data from the terminal is received through the communication interface 1001 and is further processed by the processor 1002. In a downlink, service data and signaling messages are processed by the processor 1002 and are sent to the terminal through the communication interface 1001.

Furthermore, the base station 1000 may further include a memory 1003, and the memory 1003 is configured to store program codes and data of the base station 1000. In addition, the base station may further include a communication unit 1004. The communication unit 1004 is configured to support the base station in communicating with another network entity (for example, a network device in a core network). For example, in an LTE system, the communication interface 1004 may be an S 1-U interface for supporting the base station in communicating with an SGW; or, the communication unit 1004 may also be an S1-MME interface for supporting the base station in communicating with an MME.

It is to be understood that FIG. 10 only illustrates a simplified design of the base station 1000. During practical application, the base station 1000 may include any number of communication interfaces, processors, controllers, memories, communication units and the like, and all base stations capable of implementing the embodiments of the disclosure fall within the scope of protection of the embodiments of the disclosure.

Those skilled in the art may realize that, in one or more examples above, the functions described in the embodiments of the disclosure may be realized by hardware, software, firmware or any combination thereof. In case of implementation with software, these functions may be stored in a computer-readable medium or transmitted as one or more instructions or codes in the computer-readable medium. The computer-readable medium includes a computer storage medium and a communication medium, and the communication medium includes any medium for conveniently transmitting a computer program from one place to another. The storage medium may be any available medium accessible for a general-purpose or application-specific computer.

In an embodiment of the disclosure, also provided is a computer storage medium, configured to store computer software instructions for the network management device or first base station above. The computer storage medium includes a program designed to execute the above method for transmitting UAV capability information.

Other implementations of the disclosure will be apparent to those skilled in the art from consideration of the specification and practice of the disclosure. This application is intended to cover any variations, usages, or adaptations of the disclosure following the general principles thereof and including such departures from the disclosure that come within known or customary practice in the art. It is intended that the specification and examples are to be considered as exemplary only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope thereof. It is intended that the scope of the disclosure is only limited by the appended claims.

What is claimed is:

1. A method for transmitting unmanned aerial vehicle (UAV) capability information, performed by a network management device and comprising:
receiving a UAV capability information query request, the UAV capability information query request being a request sent by a first base station when a terminal is handed over from a second base station to the first base station, wherein the UAV capability information query request is generated by modifying a path switch request signaling;
querying another network device for UAV capability information of the terminal according to the UAV capability information query request, the UAV capability information indicating whether the terminal has a capability of using a UAV service; and
sending the UAV capability information to the first base station, the first base station determining whether to provide UAV service for the terminal.

2. The method of claim 1, wherein querying another network device for the UAV capability information of the terminal according to the UAV capability information query request comprises:
querying, according to the UAV capability information query request, a home subscriber server (HSS) for the UAV capability information of the terminal.

3. The method of claim 1, wherein
receiving the UAV capability information query request comprises: receiving, by the network management device, a path switch request; and
sending the UAV capability information to the first base station comprises: sending a path switch request acknowledge comprising the UAV capability information to the first base station.

4. The method of claim 1, wherein, when the UAV capability information indicates that the terminal has the capability of using the UAV service, the UAV capability information further comprises:
  at least one of a UAV terminal type or UAV right information, wherein the UAV terminal type is configured to indicate a UAV type of the terminal, and the UAV right information is configured to indicate whether the terminal is authorized to access the UAV service.

5. A method for transmitting unmanned aerial vehicle (UAV) capability information, performed by a first base station and comprising:
  sending a UAV capability information query request to a network management device, when a terminal is handed over from a second base station to the first base station, wherein the UAV capability information query request is generated by modifying a path switch request signaling; and
  receiving UAV capability information from the network management device, after the network management device querying another network device for the UAV capability information of the terminal based on the UAV capability information query request, the UAV capability information indicating whether the terminal has a capability of using a UAV service;
  determining whether to provide the UAV service for the terminal, according to the received UAV capability information.

6. The method of claim 5, wherein
sending the UAV capability information query request to the network management device comprises: sending a path switch request to the network management device; and
receiving the UAV capability information from the network management device comprises: receiving, from the network management device, a path switch request acknowledge comprising the UAV capability information.

7. The method of claim 5, further comprising:
  providing the UAV service for the terminal, when the UAV capability information indicates that the terminal has the capability of using the UAV service.

8. The method of claim 7, wherein, when the UAV capability information indicates that the terminal has the capability of using the UAV service, the UAV capability information further comprises a UAV terminal type, the UAV terminal type being configured to indicate a UAV type of the terminal; and before providing the UAV service for the terminal, the method further comprises:
  determining, according to the UAV terminal type, the UAV service corresponding to the terminal.

9. The method of claim 7, wherein, when the UAV capability information indicates that the terminal has the capability of using the UAV service, the UAV capability information further comprises UAV right information, the UAV right information being configured to indicate whether the terminal is authorized to access the UAV service; and
providing the UAV service for the terminal comprises:
  performing the providing the UAV service for the terminal, when the UAV right information indicates that the terminal has the right to use the UAV service.

10. The method of claim 5, wherein the UAV service comprises at least one of:
  a UAV-specific radio resource management (RRM) service; or
  a UAV-specific power control strategy service.

11. A first base station, comprising:
  a processor; and
  a memory storing instructions executable by the processor;
  wherein the processor is configured to perform the method of claim 5.

12. A network management device, comprising:
  a processor; and
  a memory storing instructions executable by the processor;
  wherein the processor is configured to:
  receive an unmanned aerial vehicle (UAV) capability information query request, the UAV capability information query request being a request sent by a first base station when a terminal is handed over from a second base station to the first base station, wherein the UAV capability information query request is generated by modifying a path switch request signaling;
  query another network device for UAV capability information of the terminal according to the UAV capability information query request, the UAV capability information indicating whether the terminal has a capability of using a UAV service; and
  send the UAV capability information to the first base station, the first base station determining whether to provide UAV service for the terminal.

13. The network management device of claim 12, wherein the processor is further configured to:
  query, according to the UAV capability information query request, a home subscriber server (HSS) for the UAV capability information of the terminal.

14. The network management device of claim 12, wherein the processor is further configured to:
  receive a path switch request; and
  send a path switch request acknowledge comprising the UAV capability information to the first base station.

15. The network management device of claim 12, wherein, when the UAV capability information indicates that the terminal has the capability of using the UAV service, the UAV capability information further comprises:
  at least one of a UAV terminal type or UAV right information, wherein the UAV terminal type is configured to indicate a UAV type of the terminal and the UAV right information is configured to indicate whether the terminal is authorized to access the UAV service.

* * * * *